(12) United States Patent
Hayashi et al.

(10) Patent No.: US 6,648,749 B2
(45) Date of Patent: Nov. 18, 2003

(54) QUARTER VENT DUCT

(75) Inventors: Toshimasa Hayashi, Nishikasugai-gun (JP); Tetsuya Miyano, Nishikasugai-gun (JP); Isao Ito, Nishikasugai-gun (JP); Daiichiro Kawashima, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/189,553

(22) Filed: Jul. 8, 2002

(65) Prior Publication Data

US 2003/0017799 A1 Jan. 23, 2003

(30) Foreign Application Priority Data

Jul. 19, 2001 (JP) ........................ 2001-219671

(51) Int. Cl.[7] ................................ B60H 1/24
(52) U.S. Cl. .................................... 454/162
(58) Field of Search ................ 454/162, 164, 454/165

(56) References Cited

U.S. PATENT DOCUMENTS

| | | | | |
|---|---|---|---|---|
| 4,667,578 A | * | 5/1987 | Hagenah | 454/164 |
| 5,263,895 A | * | 11/1993 | Kraus et al. | 454/162 |
| 5,601,117 A | * | 2/1997 | Lewis et al. | 137/855 |
| 5,759,097 A | * | 6/1998 | Bernoville et al. | 454/162 |
| 5,904,618 A | * | 5/1999 | Lewis | 454/162 |
| 6,132,308 A | * | 10/2000 | Dietz et al. | 454/162 |
| 6,210,266 B1 | * | 4/2001 | Barton | 454/162 |
| 6,409,591 B1 | * | 6/2002 | Sullivan et al. | 454/164 |
| 6,468,148 B1 | * | 10/2002 | Furusawa et al. | 454/164 |

FOREIGN PATENT DOCUMENTS

JP 06-297503 10/1994

* cited by examiner

Primary Examiner—Derek Boles
(74) Attorney, Agent, or Firm—Posz & Bethards, PLC

(57) ABSTRACT

The seal member includes a joint portion which is integrally bonded to the peripheral edge part of the frame body, an extended portion in a plate-like shape which is extended from the joint portion outward of the frame body, and a lip portion which projects from the extended portion at an angle between 90° and 180° so as to be elastically contacted with the vehicle body.

12 Claims, 3 Drawing Sheets

QUARTER VENT DUCT

The present application is based on Japanese Patent Application No. 2001-219671, the entire contents of which are incorporated herein by reference.

BACKGROUND OF THE INVENTION

The present invention relates to a quarter vent duct which is installed in a vehicle body and adapted to conduct pressure regulation and ventilation inside a compartment.

An automobile is generally provided with a quarter vent duct for conducting pressure regulation and ventilation inside a compartment. This quarter vent duct includes, as shown in FIG. 4 for example, a frame body 100 made of hard material and having at least one opening 101, and at least one valve body 102 of soft material which is fixed to one side of the opening 101 and adapted to open or close the opening 101 with a swinging motion. The quarter vent duct is attached to a vehicle body 200 in side areas of a rear bumper at a back side thereof. When the valve body 102 swings outward, air in the compartment is guided out from the opening 101, and when the valve body 102 has closed the opening 101, invasion of dust or water from an exterior of the vehicle is prevented.

In order to realize the above described function to a maximum degree, sealing performance between the frame body 100 and the vehicle body 200 is important, and it has been customarily performed that sealing material 300 such as sponge, for example, is interposed between the frame body 100 and the vehicle body 200 to effect sealing. However, there has been such a problem that in order to interpose the sealing material 300 which is a separate body, a large number of parts are required, and assembling workability may be deteriorated. Moreover, the sealing material 300 has to be bonded to a peripheral edge part of the frame body 100 along its entire circumference by means of a double faced attachment tape or the like. On such occasions, the sealing performance may be locally deteriorated due to a dimensional error or a positioning error in some cases.

Under the circumstances, there has been disclosed in Japanese Patent Publication No. JP-A-06-297503 of unexamined patent application, a method of integrally molding a seal member of soft material on a peripheral edge part of a frame body, by moving a slide core in a state where the frame body is remained in a mold after molding of the frame body. According to this method, the seal member having high dimensional accuracy and positioning accuracy can be formed integrally with the frame body only by moving the slide core. As the results, the sealing material such as sponge or the like will be unnecessary, and the number of parts can be reduced. When the quarter vent duct obtained in this manner is assembled to a vehicle body, the frame body may be fixed to the vehicle body with the seal member pressed onto the vehicle body. By doing so, the seal member can be fixed to the vehicle body in an elastically contacted state, and hence, excellent sealing performance can be obtained.

However, according to the Japanese Patent Publication No. JP-A-06-297503, the seal member is formed only in a back face side of the frame body. For this reason, in case where the frame body has a deflection or is low in the dimensional accuracy, an elastic contact force of the seal member will be irregular in a circumferential direction of the frame body, which will lead to a decrease of the sealing performance in some areas. Further, in case where a positional error occurs while the frame body is attached to the vehicle body, the sealing performance will be deteriorated due to difference in shapes between a surface of the vehicle body and a surface of the frame body.

Under the circumstances, it has been generally conducted that a seal lip which projects at an angle from the peripheral edge part of the frame body in a direction of its outer circumference is integrally molded. However, in this case too, in case where the frame body has a dimensional error or a positional error when installed, the elastic contact force of the seal lip will be irregular, and the sealing performance will be deteriorated. Still further, there has been such disadvantage that in an area to which a larger force is applied, the seal lip may accidentally come off from the frame body.

SUMMARY OF THE INVENTION

The present invention has been made in view of such circumstances, and an object of the invention is, in a quarter vent duct in which a seal member having a lip portion is integrally bonded to a peripheral edge part of a frame body, to improve sealing performance of the lip portion, and at the same time, to prevent the seal member from coming off. In order to solve the above described problems, a quarter vent duct according to the present invention comprises a quarter vent duct adapted for an automobile comprising:

a duct body including a frame body of a hard material having at least one opening and at least one valve body of a first soft material which is fixed to one side of the opening and adapted to open or close the opening; and a seal member of a second soft material which is provided at a peripheral edge part of the frame body so as to be elastically contacted with a vehicle body of the automobile, the seal member including a joint portion integrally bonded to the peripheral edge part of the frame body, an extended portion in a plate-like shape which is extended from the joint portion outward of the frame body, and a lip portion which projects from the extended portion at an angle more than 90° and less than 180° so as to be elastically contacted with the vehicle body.

It is desirable that the frame body and the seal member are formed by integral molding in which the frame body is arranged in a mold so as to mold the frame body, and that the joint portion has at least one turned back portion which is turned back from a front face side of the peripheral edge part of the frame body to a back face side thereof.

DETAILED DESCRIPTION OF THE PREFERRED EMBODIMENTS

Figure 1:
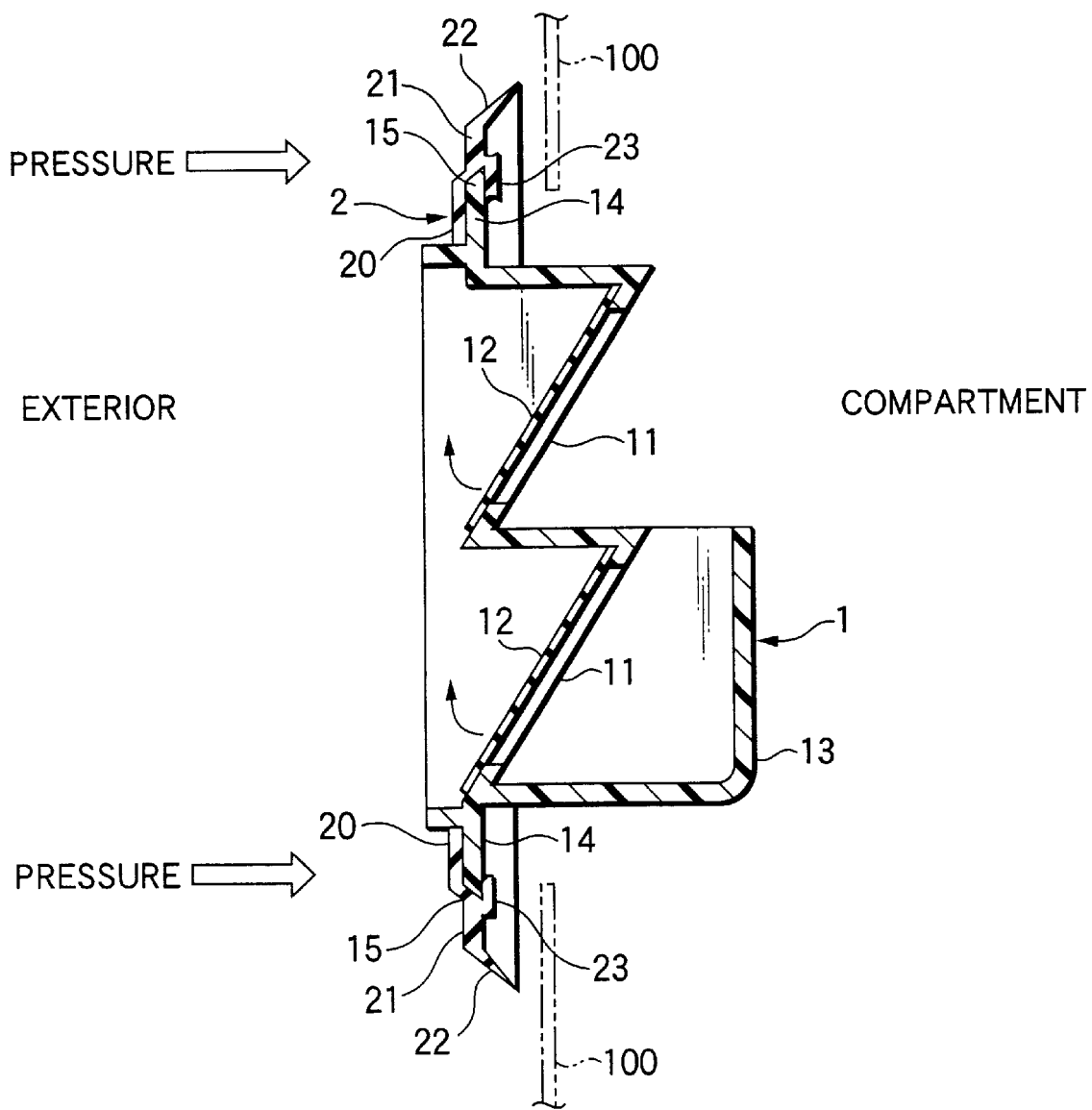
FIG. 1 is a sectional view showing a quarter vent duct according to an embodiment of the present invention in a state just before it is assembled to a vehicle body.

The quarter vent duct according to the present invention is provided with the seal member including the joint portion which is integrally bonded to the peripheral edge part of the frame body, the extended portion in a plate-like shape which is extended from the joint portion outward of the frame body, and the lip portion which projects from the extended portion at an angle between 90° and 180° so as to be elastically contacted with the vehicle body. Accordingly, when the seal member is pressed to the vehicle body on occasion of installing the quarter vent duct to the vehicle body, the lip portion is elastically deformed at first. Further, in a case where deformation such as deflection has occurred in the frame body, or in a case where the dimensional accuracy of the frame body or the positioning accuracy at the installation is low, a large force may be locally exerted on the lip portion, and the lip portion may sometimes come off from the vehicle body. However, in the quarter vent duct according to the present invention, elastic deformation will occur not only in the lip portion but also in the extended portion on such an occasion. This enables the lip portion to be elastically contacted with the vehicle body with a large elastic repulsive force, and hence, the sealing performance will be enhanced.

In a quarter vent duct having a structure such that only a seal lip directly projecting from the frame body is formed, a fulcrum of a repulsive force by the deformation of the seal lip is provided on an interface between the seal lip of soft material and the frame body of hard material. In this case, there has been such disadvantage that the seal lip is likely to come off from the frame body. However, according to the quarter vent duct of the present invention, the fulcrum of the repulsive force by the deformation of the seal lip is located mainly in a boundary part between the lip portion and the extended portion. As the results, the interface between the joint portion and the frame body is prevented from being subjected to a large force, and the seal member can be prevented from coming off.

The frame body can be formed of hard resin material such as PP in the same manner as in the conventional case, and can be of various shapes according to types of the vehicles and so on. In the peripheral edge part of the frame body to which the seal member is bonded, there are preferably provided means for improving bonding strength with respect to the joint portion of the seal member. As example of such the means, means for increasing contact area between the frame body and the joint portion, means for mechanically engaging with the joint portion, or means for enhancing the bonding strength by anchoring effect and so on can be raised. Specifically, a method of imparting a taper shape in cross section to an end face of the peripheral edge part, a method of forming grains or a knurled face on a surface of the peripheral edge part, a method of forming a slit in the peripheral edge part, and so on can be raised as the examples. In case of imparting the taper shape in cross section, an angle of the taper is preferably 15° to 80°. With an angle smaller than this range, the strength will be insufficient, and with an angle larger than this range, an effect of increasing the contact area will be deteriorated.

A valve body of soft material is fixed to one side of the opening of the frame body and adapted to open or close the opening with a swinging motion. As for this valve body, a conventional butterfly valve may be used, and as for the material, soft material such as rubber, TPE, TPO or the like may be employed.

The seal member which provides a characteristic feature of the present invention is composed of the joint portion, the extended portion and the lip portion, and bonded to the entire circumference of the frame body. This seal member can be formed as a separate body from the frame body and then, bonded to the frame body by pasting. However, from a viewpoint of reducing manufacturing steps in number, it is preferable that after the frame body has been arranged in a mold as an insert, the seal member is integrally molded. It is also preferable that the seal member is integrally molded employing the mold in which the frame body has been molded, by moving a slide core in a state where the frame body is kept in the mold. The method of manufacture disclosed in the aforesaid Japanese Patent Publication No. JP-A-06-297503 for example can be employed for this purpose.

The joint portion is a portion to be bonded to the frame body, and may preferably be bonded to the peripheral edge part of the frame body with a large contact area. For this purpose, it is desirable that the joint portion is designed so as to be bonded to both a front face and a back face of the peripheral edge part of the frame body. For example, there is a method of forming the joint portion in a bifurcated shape so as to clamp the peripheral edge part of the frame body. In case where the seal member is integrally molded with the frame body, there is a method of forming at least one turned back portion which is turned back from the front face side of the peripheral edge part of the frame body to the back face side.

The extended portion is a plate-like portion extending outwardly from the joint portion, and can be elastically deformed to some extent. The longer the extended portion projects outwardly, the more the extended portion tends to be deformed. A length from 2 mm to 5 mm is sufficient as the length of projection, and with a larger length than this size, the extended portion will be too easily deformed, resulting in deterioration of the sealing performance. The thickness of the extended portion is desirably equal to or larger than the thickness of the lip portion. In some cases where the thickness of the extended portion is too small, the extended portion will be deformed too easily, also resulting in deterioration of the sealing performance. The extended portion may project in parallel to the peripheral edge part of the frame body, or alternatively, may project at an angle with respect to the peripheral edge part of the frame body.

The lip portion is a portion to be elastically contacted with the vehicle body to realize the sealing performance, preferably having a JISA hardness ranged between 40 degree and 80 degree. The lip portion is desirably in a wedge-like shape in cross section decreasing its thickness toward its tip end. This lip portion projects from the extended portion at an angle between 90° and 180°. With such a structure, high elastic repulsive force will be generated when the lip portion is pressed to the vehicle body, and excellent sealing performance can be assured. Moreover, the fulcrum of the repulsive force when the lip portion is pressed to the vehicle body can be on a boundary between the lip portion and the extended portion, and the seal member can be prevented from coming off from the frame body.

The present invention will be described specifically by way of embodiments hereunder.

Figure 2:
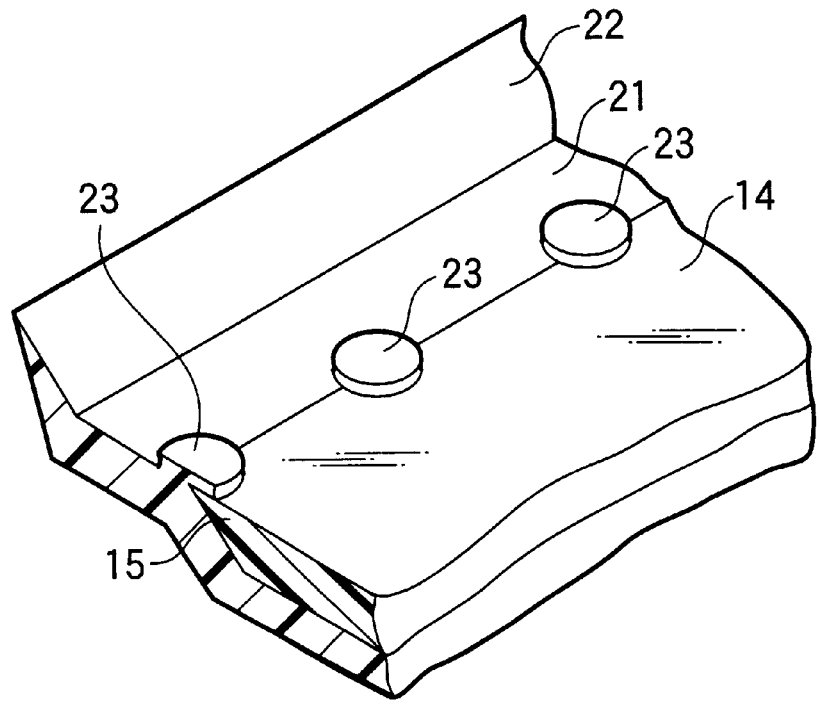
FIG. 2 is a perspective view partly cut away showing an essential part of the quarter vent duct according to the embodiment of the present invention.

FIG. 1 is a sectional view showing a state in which a quarter vent duct according to the present embodiment is being attached to a vehicle body, and FIG. 2 is a perspective view partly in section of an essential part of the quarter vent duct according to the present invention. This quarter vent duct is composed of a duct body 1, and a seal member 2 which is formed in a peripheral edge part of the duct body 1 along its entire circumference. The duct body 1 is composed of a frame body 10 formed of PP and having at least one opening 11, and at least one butterfly valve 12 which is attached to an upper edge of the opening 11 at its one side.

The frame body 10 is formed with a plurality of openings 11, and provided with a container part 13 in a compartment side for storing water or the like which has inevitably intruded. A flange portion 14 is formed along an entire circumference of a peripheral edge part of the frame body 10, and at a tip end of the flange portion 14, there is formed a tapered portion 15 having a taper shape in cross section. A tapering angle of the tapered portion 15 is 30°.

The butterfly valve 12 is formed of a rubber film, and adapted to open the opening 11 by swinging in a direction of an arrow mark from its lower end, when air pressure inside the vehicle is larger than air pressure outside the vehicle, thereby to conduct ventilation in the compartment.

The seal member 2 is formed of TPO having JISA hardness of 55 degree, and integrally formed with the frame body 10 in such a manner that the seal member 2 is molded with the frame body 10 kept in the same mold in which the frame body 10 has been molded, employing a core back method. This seal member 2 is composed of a joint portion 20 bonded to the flange portion 14 and the tapered portion 15 of the frame body 10, an extended portion 21 projecting from the joint portion 20 and extending in a direction of an outer circumference of the flange portion 14, and a lip portion 22 projecting inwardly from the extended portion 21 diagonally at a predetermined angle (130°). The seal member 2 is formed along the entire circumference of the flange portion 14. In addition, a plurality of turned back portions 23 which have been locally formed by moving pins backward when the seal member 2 is molded are formed in a state turned back from the joint portion 20 to a back face side of the flange portion 14. Each of the turned back portions 23 is formed in a shape of a disc having a diameter of 3 mm.

The quarter vent duct in the present embodiment which has been formed as described above is mounted to the vehicle body by pressing the flange portion 14 from the exterior of the vehicle toward a mounting position of the vehicle body 100 in the direction of an arrow mark, as shown in FIG. 1. On this occasion, the lip portion 22 is pressed by the vehicle body 100 and elastically deformed in a flexible manner. In case where a dimensional error or a positional error has occurred, a large force may be locally exerted on the lip portion 22 in some areas in a circumferential direction. However, in such areas, the extended portion 21 also will be elastically deformed, and the force for bringing the lip portion 22 into elastic contact with the vehicle body 100 will be increased. Accordingly, the lip portion 22 can be brought into elastic contact with the vehicle body 100 along the entire circumference, and high sealing performance can be assured.

Even when a large force has been exerted on some areas of the lip portion 22, a fulcrum of a repulsive force is located mainly on a boundary part between the lip portion 22 and the extended portion 21, and a least force is exerted on an interface between the joint portion 20 and the flange portion 14. Further, since the tapered portion 15 is formed at the tip end of the flange portion 14, a sufficient contact area is maintained with respect to the joint portion 20. Accordingly, such disadvantage that the seal member 2 may come off from the flange portion 14 can be reliably prevented. Still further, in the areas where the turned back portions 23 are provided, the turned back portions 23 can resist against the force in a direction of peeling the joint portion 20, and so, coming off of the joint portion 20 will be further prevented.

Figure 3:
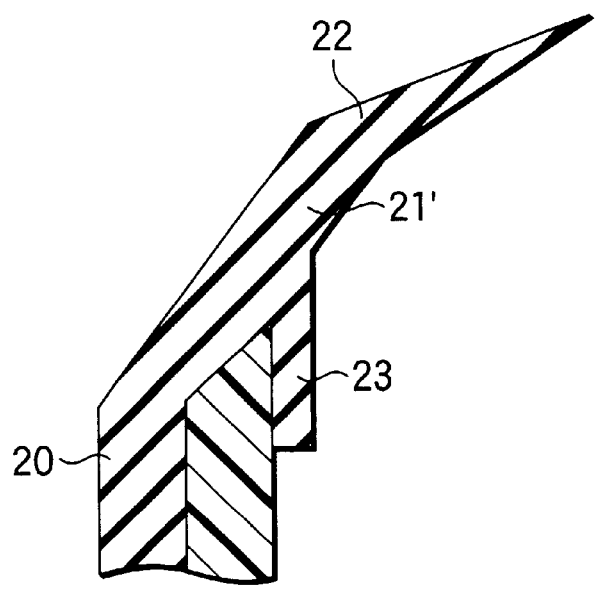
FIG. 3 is a sectional view showing another example of the essential part of the quarter vent duct according to the embodiment of the present invention.
Figure 4:
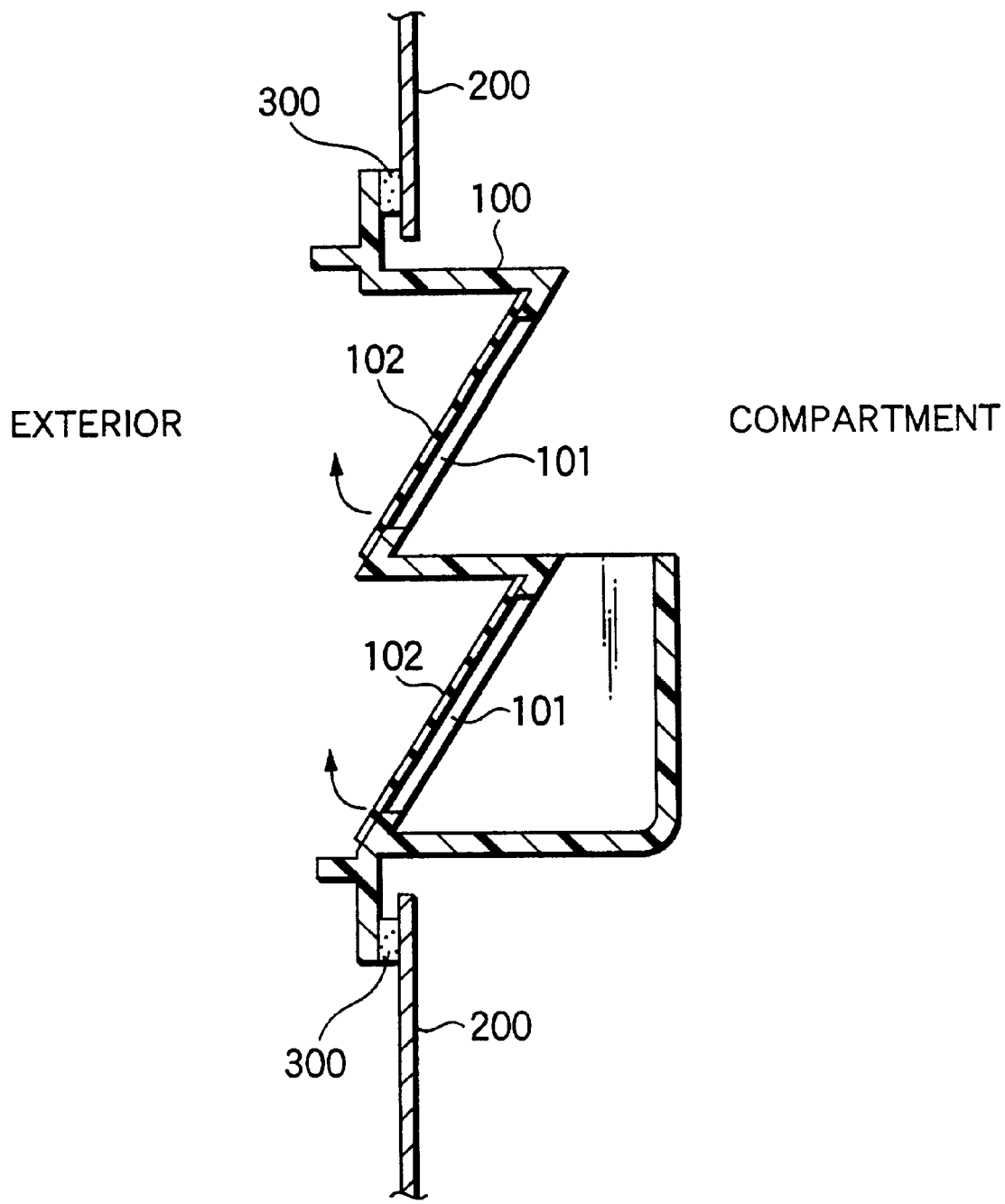
FIG. 4 is a sectional view showing a conventional quarter vent duct in a state assembled to a vehicle body.

Although the extended portion 21 in the above described embodiment projects from the joint portion 20 in the direction of the outer circumference of the flange portion 14, an extended portion 21' may be provided, as shown in FIG. 3, so as to be inclined with respect to an extending direction of the flange portion 14. In this case too, the same operational effects as in the embodiment 1 can be attained.

In summary, according to the quarter vent duct of the present invention, even though the dimensional accuracy and the assembling accuracy are not so high, excellent sealing performance can be realized and, at the same time, coming off of the seal member from the frame body can be reliably prevented.

What is claimed is:

1. A quarter vent duct adapted for an automobile comprising:
    a duct body including a frame body of a hard material having at least one opening and at least one valve body of a first soft material which is fixed to one side of said opening and adapted to open or close said opening; and
    a seal member of a second soft material which is provided at a peripheral edge part of said frame body so as to be elastically contacted with a vehicle body of, the automobile, said seal member including
        a joint portion integrally bonded to the peripheral edge part of said frame body,
        an extended portion in a plate-like shape which is extended from said joint portion outward of said frame body, and
        a lip portion which projects from said extended portion at an angle more than 90° and less than 180° so as to be elastically contacted with the vehicle body.

2. A quarter vent duct according to claim 1, wherein said frame body and said seal member are formed by integral molding in which said frame body is arranged in a mold so as to mold said frame body, and
    said joint portion has at least one turned back portion which is turned back from a front face side of the peripheral edge part of said frame body to a back face side thereof.

3. A quarter vent duct according to claim 1, wherein the lip portion is formed in a wedge-like shape in gross section, wherein the thickness of the cross section decreases toward a tip end thereof.

4. A quarter vent duct according to claim 1, wherein a tapered portion is formed at a tip end of the frame body.

5. A quarter vent duct according to claim 1, wherein the extended portion and the lip portion are integrally formed of the same material.

6. A quarter vent duct according to claim 1, wherein the joint portion, the extended portion and the lip portion are integrally formed of the same material.

7. A quarter vent duct adapted for an automobile comprising:
    a duct body including a frame body of a first material, which is relatively hard, wherein the frame body includes a flange portion, and the duct body has at least one opening and at least one valve body, which is made of a first soft material, is fixed to one side of the opening, and is adapted to open or close the opening;
    a seal member, which is made of a second soft material, wherein the seal member is attached to the flange portion for elastically contacting a vehicle body of the automobile, the seal member including:
        a joint portion bonded to the flange portion, wherein at least a part of the joint portion is generally planar and parallel to the flange portion;
        an extended portion, which has a plate-like shape and which extends from the joint portion in an outward direction from the frame body and away from the opening of the duct body; and a lip portion, which projects from the extended portion at an angle more than 90° and less than 180° for elastically contacting the vehicle body.

8. A quarter vent duct according to claim 7, wherein the frame body and the seal member are molded together, and the joint portion has at least one turned back portion, which is turned back from a front face side of the flange portion to a back face side thereof.

9. A quarter vent duct according to claim 7, wherein the lip portion is formed in a wedge-like shape in cross section, wherein the thickness of the cross section decreases toward a tip end thereof.

10. A quarter vent duct according to claim 7, wherein an outer edge of the flange portion includes a tapered region.

11. A quarter vent duct according to claim 7, wherein the extended portion and the lip portion are integrally formed of the same material.

12. A quarter vent duct according to claim 7, wherein the joint portion, the extended portion and the lip portion are integrally formed of the same material.

* * * * *